Dec. 6, 1927.                                                      1,651,831
F. L. MORSE
CHAIN ADJUSTING DEVICE
Filed Sept. 17, 1923

WITNESS.
Gustav Genzlinger.

INVENTOR
Frank L. Morse
BY Symmestwedt Lechner
ATTORNEYS

Patented Dec. 6, 1927.

1,651,831

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

CHAIN-ADJUSTING DEVICE.

Application filed September 17, 1923. Serial No. 663,166.

This invention relates to improvements in chain adjusters and is particularly useful for front end drives for automobiles where the accessory shaft is preferably kept in a fixed position, in connection with which it will be described.

One of the primary objects of my invention is to provide an effective chain adjusting device which will keep the proper running tension on the chain at all times, thereby reducing shocks and greatly lengthening the life of the chain.

Another object is to provide a device which insures adjustment of the chain without depending on the vigilance of the operator.

Still another object is to provide a device which adjusts itself while the mechanism of which it forms a part is in operation.

Still another object is to provide a device for automatically adjusting the chain without disturbing the shaft center.

In general, my invention is an improvement over devices in use which depend on hand adjustment and in which there is danger of serious damage due to neglect on the part of the operator.

The foregoing together with such other objects as may hereinafter appear, or are incident to my invention, I obtain by means of a construction which I have illustrated in preferred form in the accompanying drawing, wherein.

Figure 1:
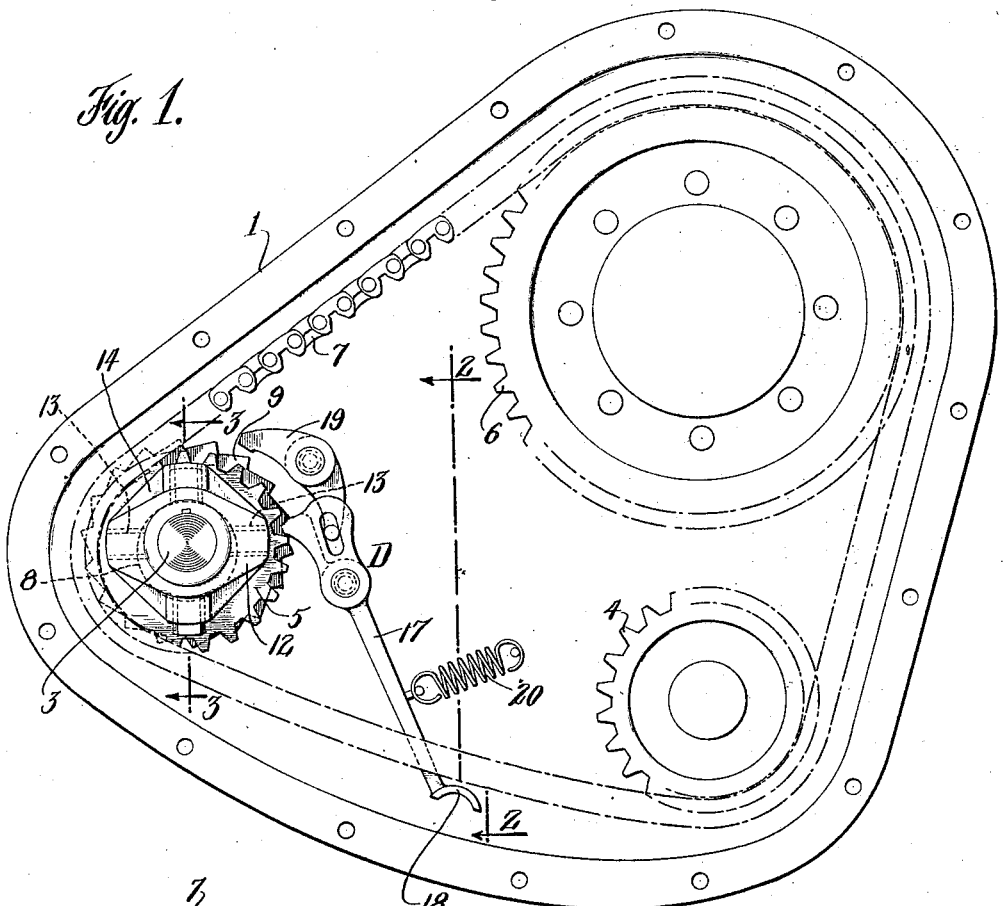
Fig. 1 is a face view of a typical arrangement of front end drive for automobiles with my device shown applied thereto.
Figure 2:
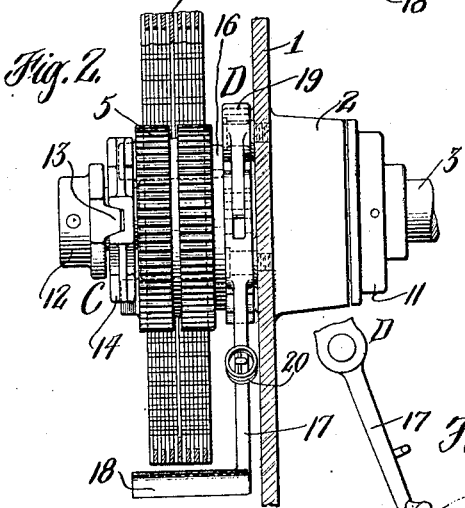
Fig. 2 is a section on the line 2—2 of Fig. 1.
Figure 3:
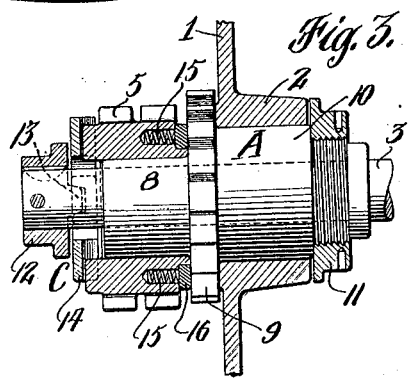
Fig. 3 is a section on the line 3—3 of Fig. 1.

Referring to the drawing, the reference numeral 1 indicates the gear casing, having a bearing 2, for the adjusting device through which the accessory shaft 3 passes. The shaft 3 drives a number of accessory units due to which it is impossible to provide chain adjustment by moving the entire shaft, and it is to overcome this difficulty that applicant has provided a chain adjusting device capable of being automatically operated while the shaft is in motion and without disturbing the shaft centre.

The triangular layout shown consists of the crank shaft sprocket 4, the accessory shaft sprocket 5 and the cam shaft sprocket 6 driven by the chain 7 in clockwise direction as viewed in Fig. 1. The adjusting device comprises the bearing 2, adjusting member A, sprocket 5, coupling C and the controlling lever arrangement D. The adjusting member A is provided with an eccentric extension 8 on which the sprocket 5 revolves, a ratchet wheel 9 and a concentric portion 10 which is mounted to revolve in the bearing 2 of the gear casing and is prevented from end movement by the collar 11. The accessory shaft 3 passes through the adjusting member central with the ratchet wheel and has keyed to its outer end, that is the end projecting in the gear case, an end flange 12, having tapered jaws or lugs 13 adapted to engage correspondingly tapered recesses in the floating clutch member 14. The opposite face of the member 14 is also provided with recesses disposed at right angles to the jaws 13 which engage similar jaws on the sprocket 5. In order to insure perfect engagement of the coupling parts I have provided the springs 15 which are carried by the sprocket 5 and which bear against the hardened washer 16.

It is to be observed that this spring arrangement also serves to keep the sprocket 5 and adjusting member A in frictional engagement for the purpose of advancing the eccentric 8 when the lever 17 is disengaged from the ratchet wheel 9. This disengagement is brought about by the chain, when slack, coming in contact with the extension 18 on the lever 17. When the lever is so tripped the pawl 19 is brought into engagement with the ratchet wheel and the wheel is only free to travel until the nearest tooth engages the pawl.

Figure 4:
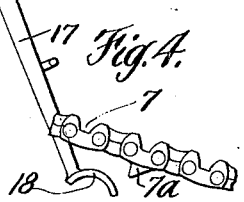
Fig. 4 is a fragmentary view showing a chain with a striking lug.

In some cases where it is not desirable to cause the chain slack to directly strike the tripping lever I can introduce a special link in the chain having the projecting lug 7ª (see Fig. 4) which is adapted to strike the extension 18 on the lever 17.

It will be seen that every time the lever and pawl are actuated the ratchet wheel carrying the eccentric is moved around due to the friction caused by the springs 15 and washer 16. Obviously moving around of the ratchet wheel throws the eccentric out and takes up the slack of the chain. This same operation takes place each time the chain becomes slack, the lever 17 being returned into engagement with the ratchet wheel by means of the spring 20, after the slack has been taken up.

It is to be understood that this device may also be applied to generator mountings in which case the generator shaft would be detachably connected to the shaft 3.

While I have described my invention as applied to a shaft having only one loop of chain it is to be understood that it is equally applicable to multiple units in which two or more chains are carried by the accessory shaft. In such cases there would be a number of adjusting devices the sprockets being driven as one by means of floating couplings interposed between them.

Other advantages will occur to those skilled in the art.

I claim:

1. A front end drive for automobiles comprising in combination two or more sprocket wheels, a chain driving said wheels, means for altering the tension of the chain by steps, means for moving said tension changing means, and means automatically controlling the moving means actuated by changes in position of the slack run of the chain.

2. An adjusting device for endless chains including a tension adjuster, means for moving said adjuster and means operated by the chain when the slack therein changes for controlling the adjuster.

3. An adjusting device for endless chains including a tension adjuster, means for moving said adjuster and means operated by the changes of slack in the chain for controlling the adjuster, said last mentioned means holding the tension adjuster in the adjusted position until further slack obtains.

4. An adjusting device for endless chains including a tension adjuster, means for moving said adjuster, means holding the adjuster against movement, means actuated by the changes of slack in the chain for releasing the holding means, and means actuated by the releasing means for controlling the amount of adjustment.

5. A front end drive for automobiles comprising, in combination, two or more sprocket wheels, a chain driving said wheels, means for adjusting the tension of the chain, means for normally holding the same in adjusted position until disengaged thru the medium of the slack run in the chain and means actuated by the holding means to control the amount of adjustment.

6. A front end drive for automobiles comprising, in combination, two or more sprocket wheels, a chain driving said wheels, means for adjusting the tension of the chain, means for normally holding the same in adjusted position until disengaged thru the medium of the slack run in the chain and means actuated by the holding means to control the amount of adjustment, said operations being repeated as further slack obtains.

7. An adjusting device for endless chains including a tension adjuster, means for moving said adjuster, means holding the adjuster against movement, means actuated by the changes of slack in the chain for releasing the holding means, said means comprising a pivoted lever extended at one place in the path of movement of the slack chain.

In testimony whereof, I have hereunto signed my name.

FRANK L. MORSE.